Figure 1:
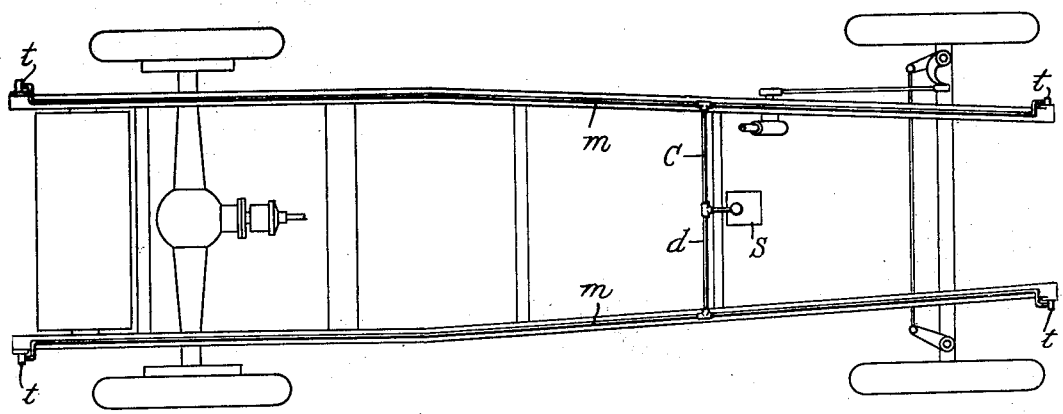

April 24, 1934.    J. BIJUR    1,955,733
FLOW CONTROL FITTING
Original Filed Aug. 9, 1922

INVENTOR
Joseph Bijur
BY
ATTORNEYS

Patented Apr. 24, 1934

1,955,733

UNITED STATES PATENT OFFICE 1,955,733

FLOW CONTROL FITTING

Joseph Bijur, New York, N. Y., assignor to Auto Research Corporation, a corporation of Delaware Original application August 9, 1922, Serial No. 580,668. Divided and application June 5, 1928, Serial No. 282,960, now Patent No. 1,734,027, issued October 29, 1929. Divided and this application October 8, 1929, Serial No. 398,158

31 Claims. (Cl. 184—7)

My present invention relates primarily to chassis lubrication and is more especially concerned with flow control devices of the general type disclosed in my issued Patent No. 1,632,772 of June 14th, 1927, and known as drip plugs.

While the drip plugs of my present invention are of general application to various distributing systems of the generic type disclosed in my issued patent, they have particular utility in the specific type of such systems where it becomes desirable or important to construct the leak preventing drip plug check valves in such manner as to avoid the counter pressure of even a weak check valve spring.

According to the present invention, I employ instead of a spring-seated check valve as disclosed in my issued patent, a flexible valve so light as to open under little pressure. The movement of such valve, away from its seat is limited by appropriate stop means, so as to assure the return and seating thereof due to the slight tension of lubricant tending to leak out elsewhere in the system, thereby inhibiting such leakage.

For satisfactory operation of the valves of the character set forth, it is important to exclude dirt therefrom, not only after the drip plug is installed, but throughout the prior handling thereof, before installation. The entry of dirt through the inlet end of the drip plug may be prevented by a strainer thereat. In such case the valve is preferably between said strainer and the flow restriction, the latter excluding dirt from the outlet end of the drip plug. In this construction, the valve is thus also completely enclosed and protected from mechanical injury.

According to another feature, the flow restriction of the drip plug is so related to the flexible valve, that viscous oil is maintained at and adjacent the latter, which would facilitate valve closure under the slight suction thereon. The volume of oil adjacent the valve would, moreover, prevent the entry of air and leak of oil from the system, inasmuch as substantially all of such oil would have to be drawn past the valve before such failure of operation could occur.

While the flow restriction may be of any of the numerous alternative constructions shown in my parent application, Serial No. 580,668, filed August 9th, 1922, of which this is a division, I have illustratively shown one embodiment comprising a restriction or obstruction in the form of a diaphragm. The restriction illustratively serves the additional function of a back or limiting stop for the floating valve, which may be a flap valve held at its periphery. I have also shown an oil trap interposed between the restriction and the bearing nipple of the fitting, which serves as an additional safeguard to prevent the entry of air.

Figure 2:
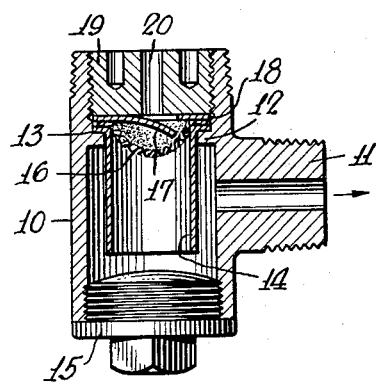

In the accompanying drawing in which are shown one or more of various possible embodiments of the several features of the invention, Fig. 1 is a diagrammatic view of a vehicle showing the piping system and location of typical bearings thereof, and, Fig. 2 is a view in longitudinal cross-section showing one embodiment of drip plug construction.

In Fig. 1 of the drawing is shown diagrammatically the general layout of the chassis of an automobile, equipped with a lubricant supply unit S, illustratively at the dashboard, serving periodically to force lubricant into the head of a distributing system which includes headers $c$ and $d$, which communicate at their ends with two mains $m$, that extend the length of the channel frames and feed various bearings, at or near which the drip plug terminals $t$ are applied. Bridging conduits (not shown) are provided, leading to distributing piping on the axles, and supplying similar drip plugs at or near the bearings thereof (not shown).

In Fig. 2, I have shown a drip plug embodying a vertical tube 10 open at both ends and having an integral lateral nipple 11 by which it is affixed to the bearing, preferably in vertical position. The tube has an integral ledge or shoulder 12 therein near the upper end thereof, upon which rests the out-turned flange 13 of a sleeve 14 extending downward therefrom, affording substantial clearance thereabout with respect to the inner wall of the fitting and extending substantially below the bore of the nipple 11. The lower end of the fitting is closed by a plug 15.

Upon the flange 13 rests the periphery of a bowl-shaped membrane 16 of parchment, calfskin or a similar high resistance porous material, said membrane being bowed outward into the tube and affording a high resistance to flow. At the concave side of the membrane is disposed a flexible valve illustratively a flap valve which comprises a disk 18 of a limber material, such as leather or of thin spring steel, having a struck-out tongue 17 adapted to flex out of the plane of the disk into the cavity determined by the bowl-shaped membrane. An inlet plug 19 axially perforated at 20 affords a seat at its inner end for the flap valve 17 and serves to clamp the periphery 18 of the flap valve, the periphery of the membrane 16 and flange 13 of the sleeve 14 securely against the flange 12 and thus to complete the assembly.

In the operation of the system of Fig. 1 equipped with drip plugs t such as those of Fig. 2, lubricant will readily unseat the flexible check or non-return valves 17, to allow emission to the bearings at the rates imposed by the corresponding restriction members 16.

After pressure on the pipe line has been discontinued, the tension of lubricant tending to leak from the piping exerts suction to close the light non-return valves 17, of those drip plugs governing the flow to bearings at higher level, thereby excluding air from the system at that region and thus functioning to inhibit emission or leak as long as the pressure source is out of operation.

The restrictions 16 being beyond the corresponding non-return valves, they retain oil in engagement therewith after the system has ceased feeding, so that the suction due to the lubricant in the pipe branches leading to bearings at lower level has first to pull such oil through the crevice between the valves 17 and the corresponding seats,—a slow operation even with a defective valve,—before air can go through. Oil by its capillary action helps seal the flexible valve and in fact, insures its being pulled to its seat at once. Being viscous, oil resists being drawn through the crack by the very light force available.

Since a valve of leather or other limber material might droop so far away from the seat as to be urged away from, rather than towards its seat by the suction flow described, it is important to provide means to limit the valve deflection. This is accomplished in the specific embodiment shown by the engagement of the valve with the restriction member 16.

The valve being disposed within the drip plug, between the plug 19 at one end, and the restriction member 16, at the other, is not only protected from mechanical injury, but may also be guarded from derangement by the entry of dirt thereto, either through the inlet or the outlet end of the drip plug. In such an installation, the drip plug may be handled in usual course prior to installation in the lubricating system, without danger of a particle of dirt settling between the valve and its seat. In service, a strainer before the valve keeps any dirt carried with the oil, away from the valve and the restriction hinders the entry of dirt from a bearing to the valve.

In the specific construction shown, the restriction or obstruction 16, thus performs no less than five useful functions. In addition to governing the rate of emission under a given pressure, the restriction element also protects the valve from mechanical injury, it excludes foreign particles from the valve, it affords a dam to maintain a body of oil adjacent the valve to assist valve closure and exclude air, and it limits the deflection of the valve from its seat.

The present application is a divisional application of application Serial No. 282,960, filed June 5, 1928, which has matured into Patent No. 1,734,027, patented October 29, 1929. The present application is specifically directed to Fig. 2 of said Patent No. 1,734,027, said patent having claims specifically directed to Fig. 3.

The embodiment of Fig. 3 to which said patent is specifically directed is provided with a depending tube 14 as in Fig. 2 of the present application but such tube is made of substantially the same diameter as the feed pipe leading thereto with the result that all air is swept out of the depending tube 14 during operation of the system.

According to the present application the diameter of the tube 14 is such that the oil flowing through the tube will not sweep out all the air so that the tube 14 will usually retain a substantial charge or filling of air.

Further, it will be noted in the elected embodiment (Fig. 3) of said Patent No. 1,734,027, the top or ceiling of the annular chamber encircling the tube 14 is positioned level with the outlet passageway through the nipple 11 so that there will be substantially no air trapping therein, whereas in the present application the ceiling of this chamber is positioned substantially above the outlet passage through the nipple 11 with the result that a substantial amount of air will also be trapped in the annular chamber as well as in the inner tube 14.

For this reason it is possible in the embodiment of the present application to force lubricant into this air chamber compressing the air therein at a substantially greater rate than the lubricant may be forced into the bearing, and this charge of lubricant will gradually flow into the bearing with a decrease in pressure with the expansion of air in the drip plug body. With the embodiment of Patent No. 1,734,027, however, the tendency is to sweep all of the passages inside of the drip plug casing free of air so that any charge of oil passing the restriction will immediately be forced into the bearing, there being no resilient body to take up charge of lubricant which would then be subsequently dispensed gradually to the bearing.

I claim:

1. In a drip plug, a fitting assembly having a valve seat therein, a valve disk of limber material coacting therewith, means for peripherally retaining a portion of the circumference of said disk against substantial separation from said seat, and means limiting the deflection of the central part of said valve away from its seat.

2. A drip plug including a valve seat, a flap valve coacting therewith and comprising a disk, means retaining a portion of the circumference of the periphery of said disk against said seat member, and means adjacent said valve for limiting the deflection of the latter away from said seat.

3. A drip plug comprising a pipe fitting element having means for application of an inlet pipe thereto, a flap valve comprising a disk mounted in said fitting, means peripherally clamping a portion of the circumference of said disk, said means including an inwardly extending clamping part in said fitting, and a backing piece having a circular periphery clamped against the valve periphery and serving to limit the deflection of the flap valve out of the plane of its disk.

4. A drip plug comprising a fitting assembly including a nipple for application to a bearing and a part to which an inlet pipe is adapted to be applied, a valve seat in said fitting, a flap valve for coaction therewith, said valve comprising a disk, a stop member limiting the deflection of said valve and having a circular periphery, and means including an inturned part on said fitting, clamping a portion of the periphery of said valve disk and the periphery of said stop member against said valve seat member.

5. A flow restriction metering fitting comprising a fitting assembly including a nipple for application to a bearing or other carrying element and a part to which an inlet pipe may be applied and including a valve seat, a flexible valve for coaction with said seat and a valve retainer for limiting movement of said valve said retainer being formed so that it presents a concavity toward the valve.

6. A flow restriction metering fitting comprising a fitting assembly including a nipple for application to a bearing or other carrying element and a part to which an inlet pipe may be applied and including a valve seat, a flexible valve for coaction with said seat and a valve retainer for limiting movement of said valve, said retainer being formed so that it presents a concavity toward the valve, the valve retainer being provided with a plurality of spaced openings for permitting the passage of lubricant through the valve.

7. A flow restriction metering fitting comprising a fitting assembly including a nipple for application to a bearing or other carrying element and a part to which an inlet pipe may be applied and including a valve seat, a flexible valve for coaction with said seat and a valve retainer for limiting movement of said valve, said retainer being formed so that it presents a concavity toward the valve, the valve retainer being clamped at a place along its periphery internally of the fitting around the valve seat.

8. A flow restriction metering fitting comprising a fitting assembly including a nipple for application to a bearing or other carrying element and a part to which an inlet pipe may be applied and including a valve seat, a flexible valve for coaction with said seat and a valve retainer for limiting movement of said valve, said retainer being formed so that it presents a concavity toward the valve, said valve retainer and said valve being retained in an enlargement in the end of a central passageway through the fitting.

9. A flow restriction metering fitting comprising a fitting assembly including a nipple for application to a bearing or other carrying element and a part to which an inlet pipe may be applied and including a valve seat, a flexible valve for coaction with said seat and a valve retainer for limiting movement of said valve, said retainer being formed so that it presents a concavity toward the valve, the valve retainer also serving as a restriction.

10. A flow restriction metering fitting comprising a fitting assembly including a nipple for application to a bearing or other carrying element and a part to which an inlet pipe may be applied and including a valve seat, a flexible valve for coaction with said seat and a valve retainer for limiting movement of said valve, said retainer being formed so that it presents a concavity toward the valve, the valve retainer and the valve being arranged to form a chamber between the valve retainer and the valve, the chamber retaining lubricant therein at all times and thereby causing ready seating of the valve upon tendency to reverse flow.

11. A flow restriction metering fitting comprising a fitting assembly including a nipple for application to a bearing or other carrying element and a part to which an inlet pipe may be applied and including a valve and a membrane restriction.

12. A flow restriction metering fitting comprising a fitting assembly including a nipple for application to a bearing or other carrying element and a part to which an inlet pipe may be applied and including a valve and a membrane restriction, the restriction consisting of parchment.

13. A flow restriction metering fitting comprising a fitting assembly including a nipple for application to a bearing or other carrying element and a part to which an inlet pipe may be applied and including a valve and a membrane restriction, the restriction consisting of calf skin.

14. A flow restriction metering fitting comprising a fitting assembly including a nipple for application to a bearing or other carrying element and a part to which an inlet pipe may be applied and including a restriction and a flap valve held substantially rigidly to the fitting at one point.

15. A flow restriction metering fitting comprising a fitting assembly including a nipple for application to a bearing or other carrying element and a part to which an inlet pipe may be applied and including a restriction and a flap valve held substantially rigidly to the fitting at one point, the flap valve being formed of a limber piece of leather.

16. A flow restriction metering fitting comprising a fitting assembly including a nipple for application to a bearing or other carrying element and a part to which an inlet pipe may be applied and including a restriction and a flap valve held substantially rigidly to the fitting at one point, the flap valve consisting of a thin sheet of spring steel.

17. A flow restriction metering fitting comprising a fitting assembly including a nipple for application to a bearing or other carrying element and a part to which an inlet pipe may be applied and including a diaphragm restriction, a valve and an oil trap.

18. A flow restriction metering fitting comprising a fitting assembly including a nipple for application to a bearing or other carrying element and a part to which an inlet pipe may be applied and including a diaphragm restriction, a valve and an oil trap, the valve, the diaphragm restriction and the oil trap being all positioned in the path from the inlet to the outlet of the fitting in the order named.

19. A flow restriction metering fitting comprising a fitting assembly including a nipple for application to a bearing or other carrying element and a part to which an inlet pipe may be applied and including a valve seat, a valve coacting therewith and a membrane filter placed after the valve between the inlet and the outlet of the fitting serving to prevent any dirt from being carried to the valve by reverse flow from the outlet to the inlet.

20. In a lubricating system, a check valve comprising, in combination, a conduit member having an opening therethrough and a valve seat at one end of said opening, a shoulder formed in said member adjacent said valve seat, a limiting member abutting said shoulder, a projection on said limiting member, and a flexible valve between said seat and said limiting member, said valve comprising a piece of a limber material.

21. In a lubricating system, a check valve, comprising, in combination, a conduit member having a recess terminating in a valve seat, a shoulder formed in said member adjacent said seat, a limiting member abutting said shoulder and having openings therethrough, a projection on said limiting member located centrally of said valve seat, and a flexible valve between said seat and said limiting member and beneath said seat.

22. In a lubricating system, a check valve comprising, in combination, conduit means including a valve seat, a flexible valve for cooperating with said seat, said valve comprising a piece of a limber material, and means for limiting the movement of said valve from its seat.

23. In a lubricating system, a check valve, comprising, in combination, a conduit member having a valve seat, a limiting member adjacent said seat, a flap valve between said seat and said member, and an air pocket, said valve normally held resiliently against said seat by the air in said pocket.

24. As an element in a lubricating system comprising a source of lubricant supply, pump means, and conduits leading from said pump means to the bearings to be lubricated; a check valve including a valve seat and a flap valve, said valve normally being held resiliently against its seat and forced from its seat by the pressure created by said pump means.

25. In a centralized lubricating system of the type comprising a pump and conduit means for conducting lubricant from the pump to apportioning units, one for each bearing; each apportioning unit comprising a supply chamber, an accumulating chamber, an apportioning restriction between said chambers, a check valve preventing return flow of lubricant to said supply chamber, said accumulating chamber being arranged to place lubricant delivered thereto under yielding pressure, said accumulating chamber being in open connection at all times with a bearing to be lubricated.

26. In a centralized lubricating system of the type comprising a pump and conduit means for conducting lubricant from the pump to apportioning units, one for each bearing; each apportioning unit comprising a restriction apportioning means, a supply chamber and an accumulating chamber, means for preventing return flow of lubricant from said supply chamber to said conduit means, and means in said accumulating chamber for placing the lubricant delivered thereto under yielding pressure, said accumulating chamber having open connection at all times with a bearing to be lubricated.

27. In a centralized lubricating system of the type comprising a pump and conduit means for conducting lubricant from the pump to apportioning units, one for each bearing; each apportioning unit comprising an apportioning restriction, a supply chamber at the inlet side of said restriction and an accumulating chamber at the outlet side of said restriction, lubricant being forced from said supply chamber into said accumulating chamber, through said restriction by said pump, means for preventing return flow of lubricant to said supply chamber, and means in said accumulating chamber for placing the lubricant delivered thereto under pressure, said accumulating chamber being in open communication at all times with a bearing to be lubricated.

28. In a centralized lubricating system of the type comprising a pump and conduit means for conducting lubricant from the pump to apportioning units, one for each bearing; each apportioning unit including means for proportioning charges of lubricant among the bearings, valve means to prevent reverse flow through said unit and an air trap chamber at the outlet side of said proportioning means, said proportioning means serving to prevent the maximum pressure exerted thereupon from being communicated to said trap chamber.

29. In a centralized lubricating system of the type comprising a pump and conduit means for conducting lubricant from the pump to apportioning units, one for each bearing; each apportioning unit including restriction proportioning means, an air trap for storing said proportioned charges of lubricant which have passed through said proportioning means, and means for preventing return flow from said air trap to said piping means.

30. In a centralized lubricating system of the type comprising a pump and conduit means for conducting lubricant from the pump to apportioning units, one for each bearing; each apportioning unit including a high resistance proportioning restriction and a flap valve to prevent flow between the bearings at different levels and a reservoir air trap chamber beyond said valve and restriction.

31. In a centralized lubricating system of the type comprising a pump and conduit means for conducting lubricant from the pump to apportioning units, one for each bearing; each apportioning unit including a tubular body, and a highly resistant flow metering interceptor for foreign particles extending into said body, said interceptor being annularly clamped at the opposite inlet and outlet faces thereof.

JOSEPH BIJUR.